Oct. 7, 1969 C. E. GRAWEY ET AL 3,471,180
INERTIA WELDED HOSE COUPLINGS

Filed July 31, 1967 5 Sheets-Sheet 1

INVENTORS
CHARLES E. GRAWEY
CALVIN D. LOYD
BY
Fryer, Tjensvold, Feix, Phillips & Lempio
ATTORNEYS Oct. 7, 1969  C. E. GRAWEY ET AL  3,471,180
INERTIA WELDED HOSE COUPLINGS
Filed July 31, 1967  5 Sheets-Sheet
PRIOR ART
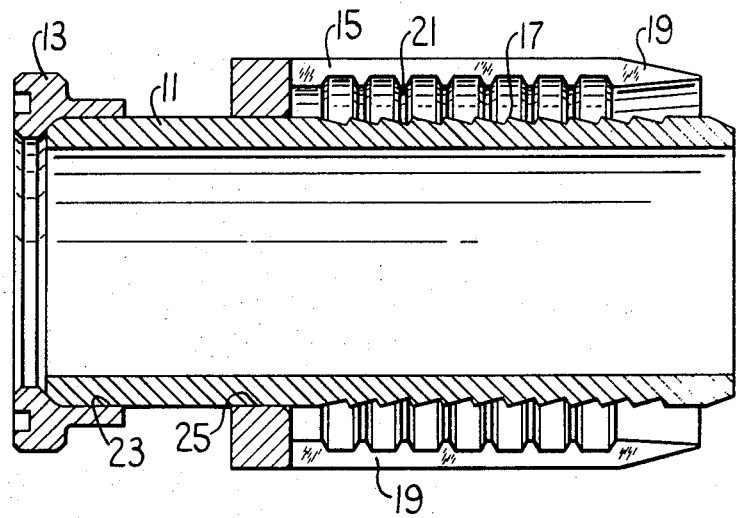
Fig-6-
INVENTORS
CHARLES E. GRAWEY
CALVIN D. LOYD
BY
ATTORNEYS

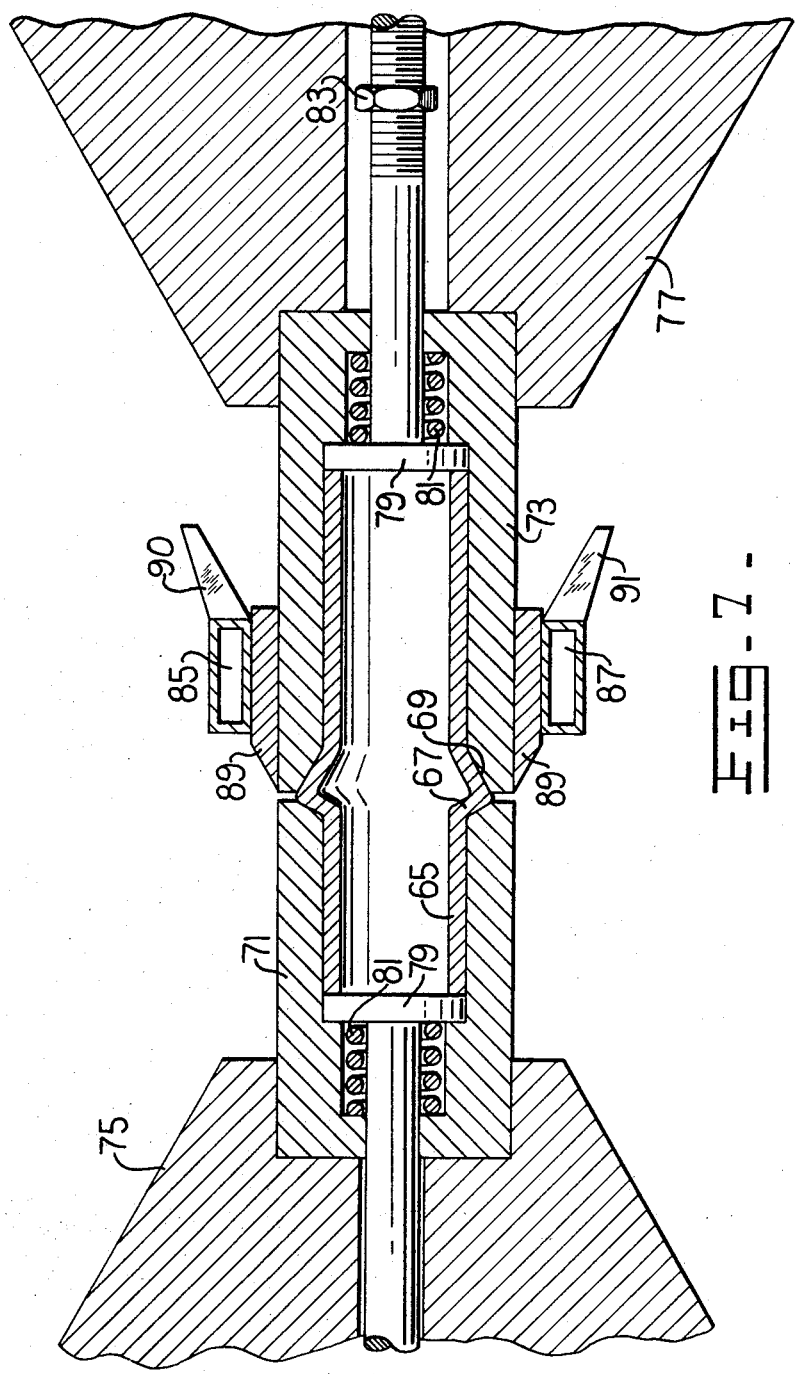

United States Patent Office 3,471,180
Patented Oct. 7, 1969

3,471,180
INERTIA WELDED HOSE COUPLINGS
Charles E. Grawey, and Calvin D. Loyd, Peoria, Ill., assignors to Caterpillar Tractor Co., Peoria, Ill., a corporation of California
Filed July 31, 1967, Ser. No. 657,186
Int. Cl. F16l *13/02*
U.S. Cl. 285—257                                        5 Claims

ABSTRACT OF THE DISCLOSURE

A hydraulic hose coupling and method of making said coupling comprising a cylindrical stem having a flange thereon to which a collet is friction or inertia welded and having an end to which a head is similarly welded, the flange on said stem being either machined, hot formed, or cold formed.

---

This invention relates to a hose coupling having a new and novel means for fixing the collet to the stem and the method of forming the coupling.

More particularly, the invention relates to a hose coupling capable of withstanding today's high hydraulic pressures and comprises a cylindrical stem having a flange thereon to which a collet is friction or inertia welded and an end to which a head is similarly welded. In the present art, a hydraulic hose coupling is formed by placing a collet over a stem in a "press fit" type of arrangement and furnace brazing the collet into place on the stem. This gives rise to problems in at least two areas: since no mechanical structure operates to keep the collet from being fitted too far onto the stem or insures that it is moved far enough over the stem, it is possible that the axial realtionship of the stem and collet may be improperly fixed; secondly, brazed couplings, in some cases, may not possess sufficient strength to withstand, indefinitely, the severe vibration, shock, and fatigue loads they are subjected to. This is due, to a great extent, to the very high temperatures (approximately 2050° F.) required for furnace brazing which soften and weaken the coupling members. Areas of the coupling can be selectively reheat-treated after brazing but this requires another operation and selective heating often produces undesirable stresses.

Additionally, since hydraulic pressure requirements are constantly rising in engineering systems, a much greater strength and service life for couplings is urgently required.

Therefore, it is an object of this invention to provide a hydraulic hose coupling having greater strength and thus able to withstand higher pressures than known couplings.

It is also an object of the present invention to disclose a hydraulic coupling having a longer service life than those previously known.

It is a further object of the invention to provide a method for forming a hydraulic coupling having the above described properties.

It is a still further object of the instant invention to disclose a method of forming a hydraulic coupling in which the collet and stem of the coupling are welded together in such a manner as to provide a stronger bond than previously available in such couplings.

It is also an object of the invention to provide a method of forming a hydraulic coupling by joining the parts thereof together by means of friction or inertia welding processes so as to produce improved molecular bonding within the coupling.

It is an object of the invention to disclose a hose coupling means wherein the stem member may be suitably formed for attachment of the collet member thereto by machining a flange at a predetermined position on the outer circumference thereof.

It is a still further object of the invention to provide a hose coupling means wherein the stem member may be suitably formed for attachment of the collet member thereto by hot or cold upset forming a flange at a predetermined position on the stem.

It is also an object of the instant invention to provide a hose coupling and a method of manufacture thereof which will allow each part of the coupling to have metallurgical properties different from those of the other parts, thereby allowing each part to be tailored to the application requirements.

It is a further object of the invention to provide a hose coupling wherein the parts are joined by welds between the parent metals which cover the entire area of contact.

It is also an object of the invention to provide a hose coupling wherein the head and stem are joined by brazing or welding and the stem and collet are joined by welding.

Other objects of the invention will become apparent to those skilled in the art upon perusal of the following description of the preferred embodiments thereof as depicted in the drawings, which are intended to illustrate but not to restrict the scope of the invention. Other embodiments or equivalents of the invention will be obvious to those skilled in the art without departing from the scope of the invention.

Referring now to the drawings:

FIG. 6 shows an axial cross-sectional view of a prior art hose coupling in common use; and FIG. 7 shows a cross-sectional view of a machine for hot upsetting a flange into the stem portion of the device.

Figure 1:
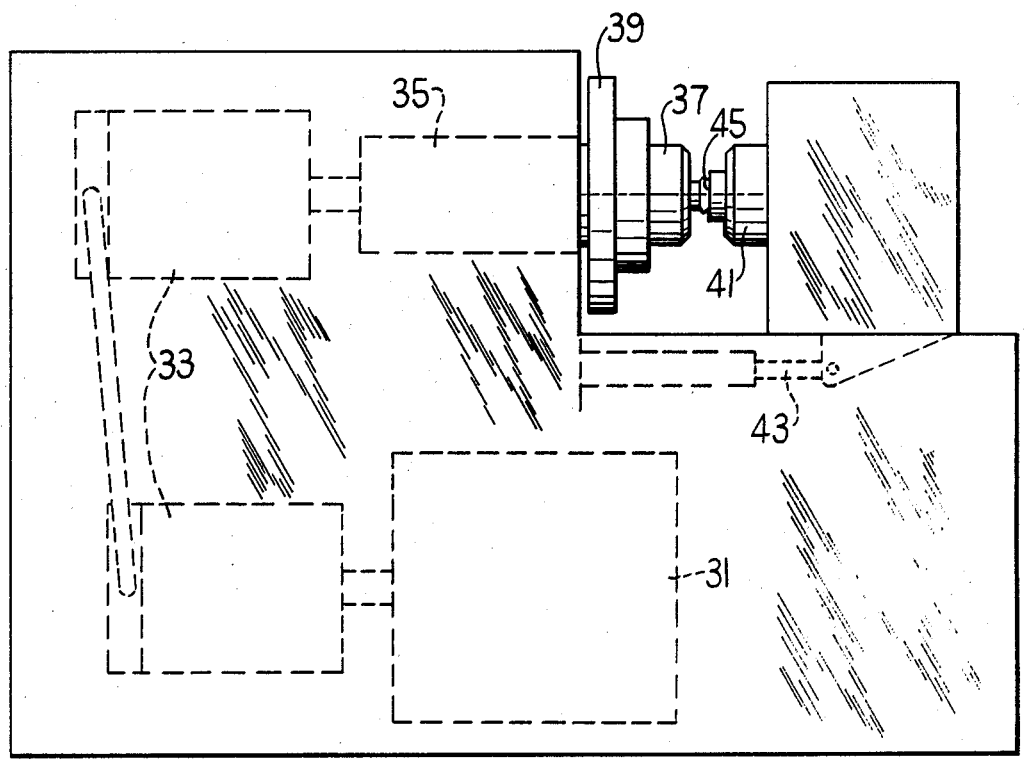
FIG. 1 shows a side elevation view of a welding machine suitable for use in forming the invention.

Now, referring to the drawings in greater detail, there is shown in FIG. 6 a prior art hydraulic hose coupling device including a stem 11 of generally cylindrical configuration, a head 13, and a collet 15.

The stem 11 has a series of radial grooves 17 on the outer periphery thereof which serve to grip the inner diameter of a hose positioned on the stem. The collet 15 has a series of fingers 19 thereon each of which has a series of internal teeth 21 which serve to grip the outer diameter of the hose positioned on the stem. The fingers 19 are pressed toward the hose by means of a collar (not shown) which is press-fit over the collet. A similar coupling is shown in U.S. Patent 3,325,194 to Grawey.

It has long been the practice in manufacturing such couplings to furnace braze the head 13 and collet 15 to the stem 11 as at 23 and 25. This has proven to be a moderately satisfactory method of forming the coupling, but the brazed joint may not have the necessary strength required to withstand high hydraulic pressures or to provide an extended service life.

Recent developments in metal bonding have given prominence to the processes of friction welding as described in "Friction Welding of Metals" by V. I. Vill, published by American Welding Society, Inc., New York, Library of Congress Catalog Card Number 62–13420, and inertia welding as described in U.S. Patent 3,273,233 to Oberle et al.

A machine similar to that described for completion of the method of the Patent 3,273,233 is shown in FIG. 1 wherein 31 is a motor which, through a clutch-transmission means 33, turns a spindle 35 carrying a chuck 37 and flywheel 39. Mounted opposite chuck 37 is a second chuck 41 which is fixed against rotation but which is movable in an axial direction by suitable means such as a hydraulic means as shown at 43. In carrying out the welding process, the chuck 37 is rotated and chuck 41 is moved toward it so that the workpieces held by the chucks are friction or inertia welded as at 45.

Due to the utilization of this welding process, the stem, head, and collet may be joined even though each possesses distinct metallurgical characteristics. This, in turn, allows the use of the best performing metal for each part of the coupling in any application. In this respect, the collet is normally soft and ductile, having a typical hardness of Rockwell "B" 50, the head is relatively hard with a typical hardness of Rockwell "C" 20 to 30, and the stem is intermediate the collet and head, having a typical hardness of Rockwell "B" 80 to 90.

If desired after the welding, the internal flash between the head and stem may be removed by machining or by any other suitable process.

Figure 2:
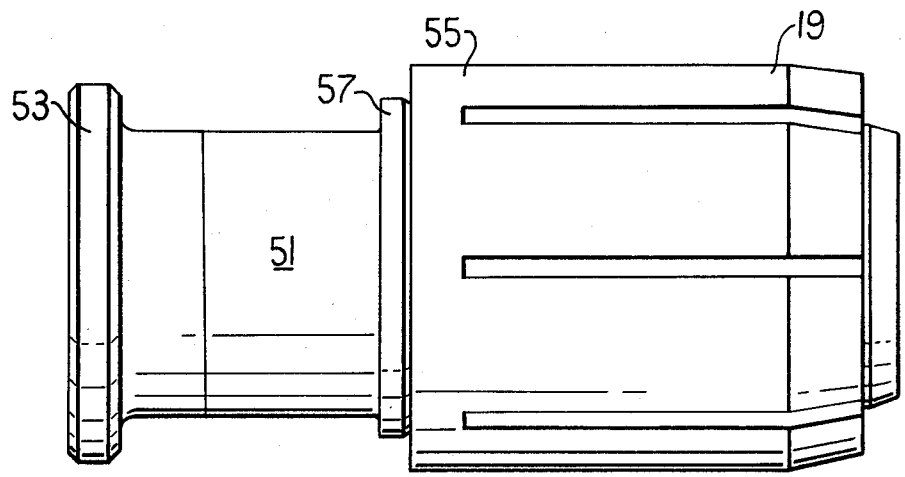
FIGS. 2 and 3 show an elevation and longitudinal cross-section, respectively, of the invention with a flange machined upon the stem portion of the device.
Figure 3:
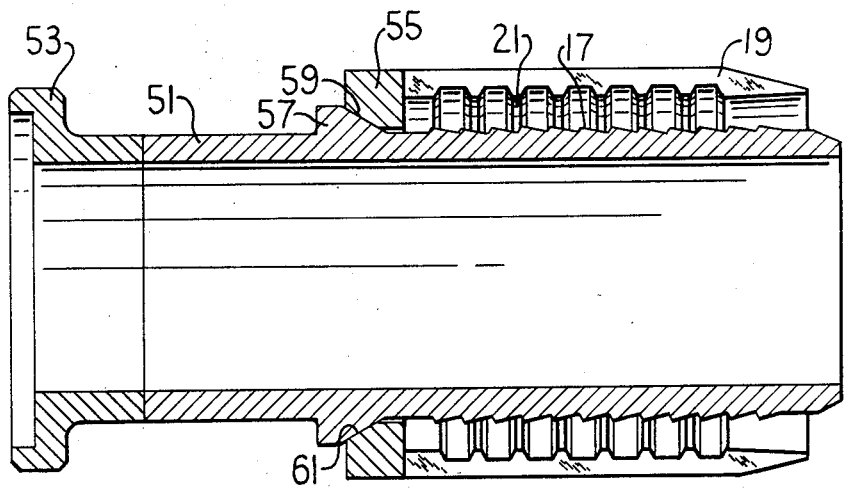

Now referring to FIGS. 2 and 3, there is shown a hose coupling having a stem 51, a head 53, and a collet 55. The stem 51 and collet 55 are similar to those previously described relative to FIG. 6 insofar as the stem carries radial grooves 17 and the collet has fingers 19 having internal teeth 21.

Stem 51 has machined thereon a flange portion 57 having an inclined surface or face 59 of a predetermined angle relative to the stem axis. Collect 55 also has an inclined mating surface 61 on the internal surface thereof which is machined at an angle relative to the collet axis which is identical or nearly identical to the angle of inclined surface 59.

In forming the coupling and fixing the head, stem, and collet together, one member, such as the stem 51, is held in one chuck, such as 37, while the collet is held in the opposing chuck 41. The workpieces are then friction or inertia welded together in the manner described in the above cited references. Then, the head and stem are similarly welded. It should be noted that the order in which the pieces are welded together or in which chucks they are placed is insignificant. It should also be noted that in some instances, it may be desirable to braze the head to the stem and inertia or friction weld the stem to the collet.

Figure 4:
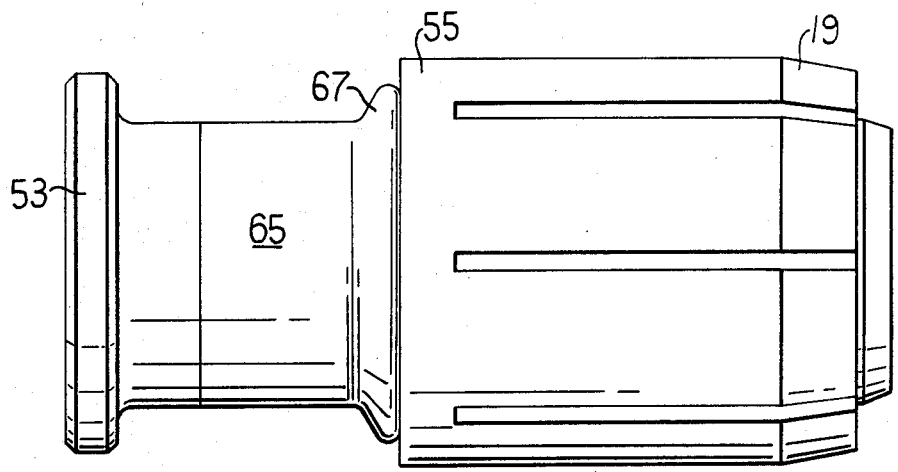
FIGS. 4 and 5 show an elevation and longitudinal cross-section respectively of the invention with a flange hot upset into the stem portion of the device.
Figure 5:
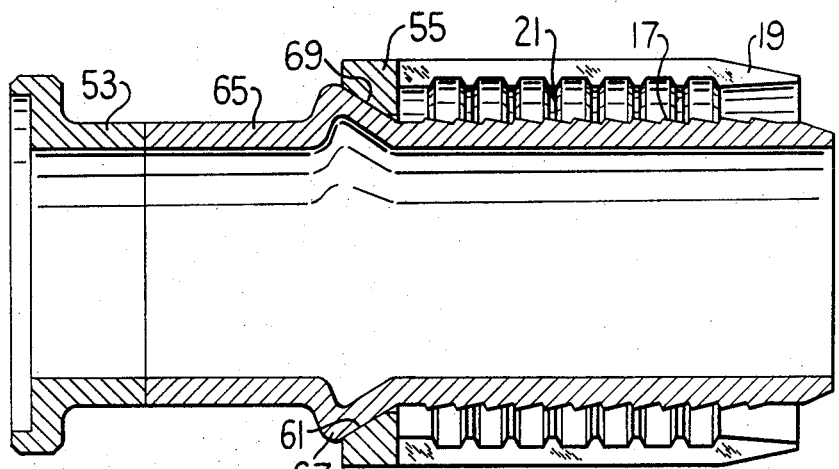

FIGS. 4 and 5 show a coupling having an identical head and collet to that of FIGS. 2 and 3 but wherein stem 65 has a flange 67 with an inclined surface 69 which is at an angle identical or nearly identical to that of collet mating surface 61. Here again, the parts of the coupling are welded together by friction or inertia welding.

Flange 67 in stem 65 may be formed by any suitable method, but it has been found very satisfactory to use a hot forming or upsetting method which allows the angle of surface 69 to be formed while upsetting the flange, thereby saving machining of the flange.

Neither the weld area of the flange nor the weld area of the collet needs to be at an angle. The collet and stem can be welded together even if only one or neither of the mating weld pieces contains an inclined weld area. The stem and collet have been illustrated with similar inclined weld areas because this type of joint provides for greater weld area with a minimum amount of flash being produced for a given amount of input energy.

One suitable device for forming flange 67 is shown in FIG. 7. Here, stem 65 is placed between stationary die 71 and movable die 73 which are held by die holder-reaction blocks 75 and 77 respectively. The stem is positioned in the dies by means of ejectors 79 which are biased by springs 81. Either or both springs may be preloaded by such means as nut 83 which bears against the outer end of the die when the dies are fully separated.

The portion of the stem to be upset is heated by suitable means such as semi-circular induction blocks 85 and 87 which are closely adjacent the stem when the dies are extended. When the proper amount of heat has been applied to the stem to make it formable, or plastic, the movable die is brought toward the fixed die. Inductor spreader ramp 89 mounted on die 73 cooperates with ramps 90 and 91 on the inductor blocks 85 and 87 to move the blocks radially away from the stem and allow passage of the die. As the dies cooperate to form flange 67, one of the dies forms surface 69 at the desired angle. Ejectors 79 then force the stem out of the dies 71 and 73 as the dies are separated.

The present hose coupling and method of making the coupling is a true advancement in the art since the life and strength of the product as well as the degree of flexibility of choice of materials of each part of the coupling is now greater than heretofore available.

What is claimed is:

1. The method of manufacturing a hose coupling comprising the steps of providing a cylindrical stem having a longitudinal axis and a well defining a bore therethrough, providing a flange at an intermediate portion on the outer wall of said stem, providing a surface on said flange which is inclined relative to said axis, providing an end surface on one end of said stem extending radially with respect to said axis, providing hose gripping means on the outer wall of said stem between said inclined surface and the other end of the stem, providing a cylindrical collet having an inclined surface adjacent one end of said collet on the inner wall thereof, the angle of incline of said collet inclined surface being complementary to that of the flange inclined surface, providing multiple fingers on said collet extending from the inclined surface to the other end of the collet, providing hose gripping means on the inner wall of said multiple fingers, providing a head member having an end surface complementary to the end surface on the said one end of said stem and a wall defining a bore therethrough, the bore in said head member being equal in diameter at said end surface of the head member to that of the bore of said stem at the said one end thereof, placing said collet over said stem in coaxial relationship thereto with the collet hose gripping means on the multiple fingers radially spaced from the stem hose gripping means and with the inclined flange surface and inclined collet surface in abutment throughout a large interface area thereof, welding said collet and said stem together throughout the interface area of the inclined surfaces, placing said head member and said stem in coaxial relationship whereby the end surface on said stem and the end surface on said head member abut throughout a large interface area thereof, and welding said head member and said stem together throughout the interface area of the end surfaces.

2. The method of claim 1 including the step of performing the welding of said stem to said collet and said stem to said head member simultaneously.

3. The method of claim 1 wherein the steps of welding said stem to the collet and head member are accomplished by friction welding.

4. The method of claim 1 wherein the steps of welding said stem to the collet and head member are accomplished by inertia welding.

5. A hydraulic hose coupling comprising a cylindrical stem having a longitudinal axis and a surface inclined relative to said axis on a flange formed intermediate the length of said stem on the outer wall thereof, said stem having a wall defining a bore therethrough, hose gripping means on the outer wall of said stem between said inclined surface and one end of said stem, a cylindrical collet having an inclined surface complementary to said inclined surface on said flange adjacent one end of said collet on the inner wall thereof, said cylindrical collet also having multiple fingers extending from the inclined surface to the other end of said collet, hose gripping means on the inner wall of the fingers of said collet, said collet coaxially mounted on said stem with the respective hose gripping means in radially spaced relationship and with said inclined surfaces in abutment throughout a large interface area thereof, a weld joining said inclined surfaces throughout the interface area, said stem further having an end surface thereon extending radially with respect to said axis, a head member having a wall defining a bore therethrough, and said head having an end surface complementary to said end surface of said stem and abutting said stem end surface over a large interface area of contact, a weld extending throughout the interface area of the abutting end surfaces, and said walls defining said bores having equal diameters at least at the area of said end surfaces.

References Cited

UNITED STATES PATENTS

| | | | |
|---|---|---|---|
| 3,325,194 | 6/1967 | Grawey | 285—257 |
| 2,133,313 | 10/1930 | Weatherhead | 285—286 X |
| 2,477,193 | 7/1949 | Melsom | 285—174 |
| 2,489,890 | 11/1949 | Hufferd | 285—256 |
| 2,562,116 | 7/1951 | Nelson | 285—259 X |
| 2,741,498 | 4/1956 | Elliott | 285—173 |
| 3,235,312 | 2/1966 | Hullander | 29—470.3 |
| 3,388,849 | 6/1968 | Blum et al. | 29—470.3 |

DAVID J. WILLIAMOWSKY, Primary Examiner

D. W. AROLA, Assistant Examiner

U.S. Cl. X.R.

285—173, 259, 286; 29—470.3